June 21, 1932.  W. A. BOHNE  1,864,413
TESTING MACHINE
Filed Feb. 5, 1930  3 Sheets-Sheet 1

Inventor:
William A. Bohne
by his Attorneys
Howson & Howson

June 21, 1932.  W. A. BOHNE  1,864,413
TESTING MACHINE
Filed Feb. 5, 1930  3 Sheets-Sheet 2
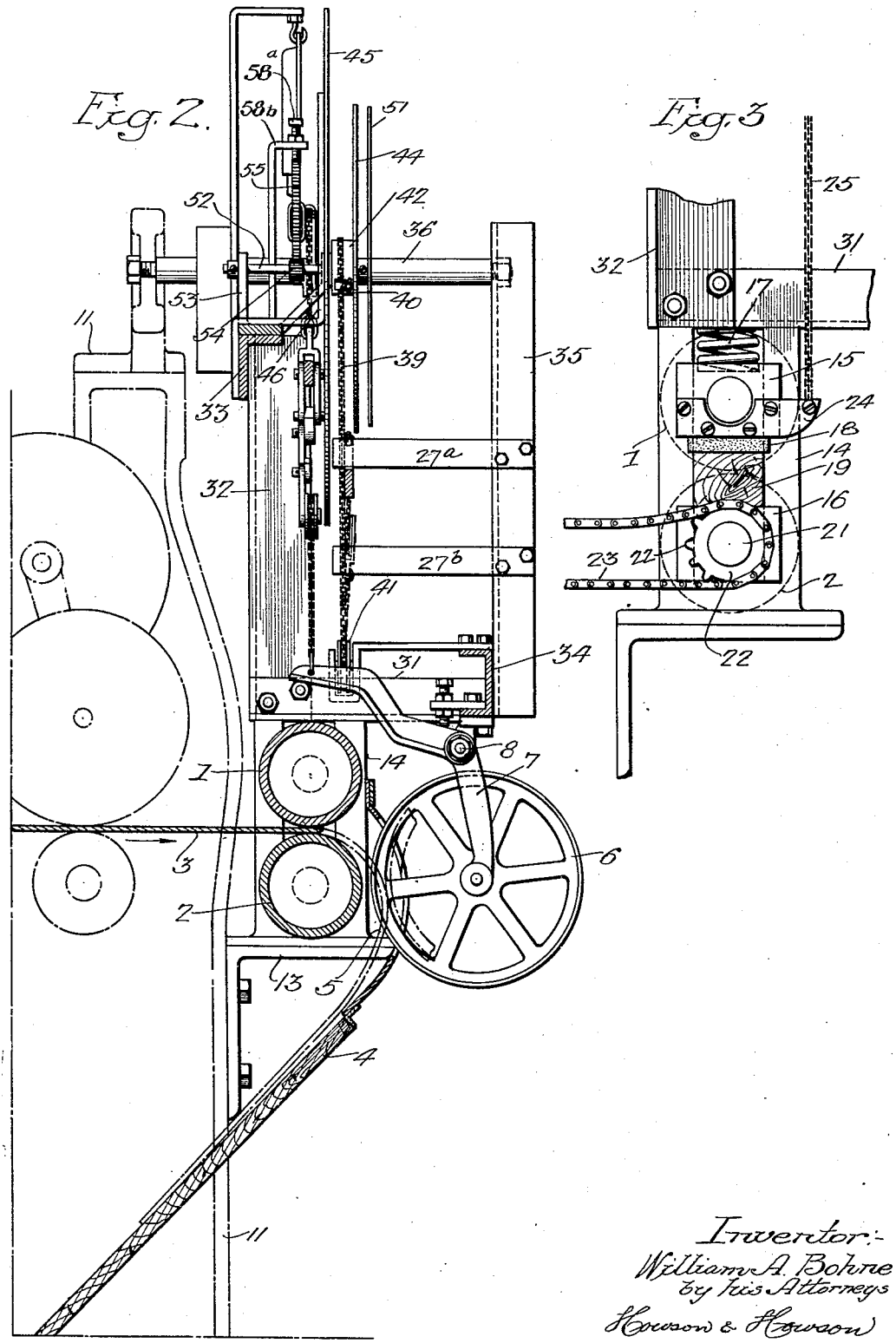
Inventor:-
William A. Bohne
by his Attorneys
Howson & Howson June 21, 1932. W. A. BOHNE 1,864,413
TESTING MACHINE
Filed Feb. 5, 1930 3 Sheets-Sheet 3

Inventor:
William A. Bohne
by his Attorneys.
Howson & Howson

Patented June 21, 1932

1,864,413

UNITED STATES PATENT OFFICE

WILLIAM A. BOHNE, OF PHILADELPHIA PENNSYLVANIA, ASSIGNOR TO E. F. HOUGHTON & COMPANY, OF PHILADELPHIA, PENNSYLVANIA, A CORPORATION OF PENNSYLVANIA

TESTING MACHINE

Application filed February 5, 1930. Serial No. 426,107.

The principal object of this invention is to provide a machine that will give an accurate indication of the renitence of leather or similar materials and will thereby afford a definite guide as to the adaptability of the material for certain purposes.

A specific object of the invention is to provide a machine of the stated type that shall include means affording an automatic correction for differing thicknesses of the materials and specimens under test.

Another specific object of the invention is to provide a machine of the stated character adapted for the testing of hides or similar test materials of extended surface area.

The invention further resides in numerous novel structural features and details hereinafter set forth and illustrated in the attached drawings, in which:

Fig. 2 is an enlarged sectional view on the line 2—2, Fig. 1;

Fig. 3 is a fragmentary side elevational view illustrating a detail of the invention.

Figure 1:
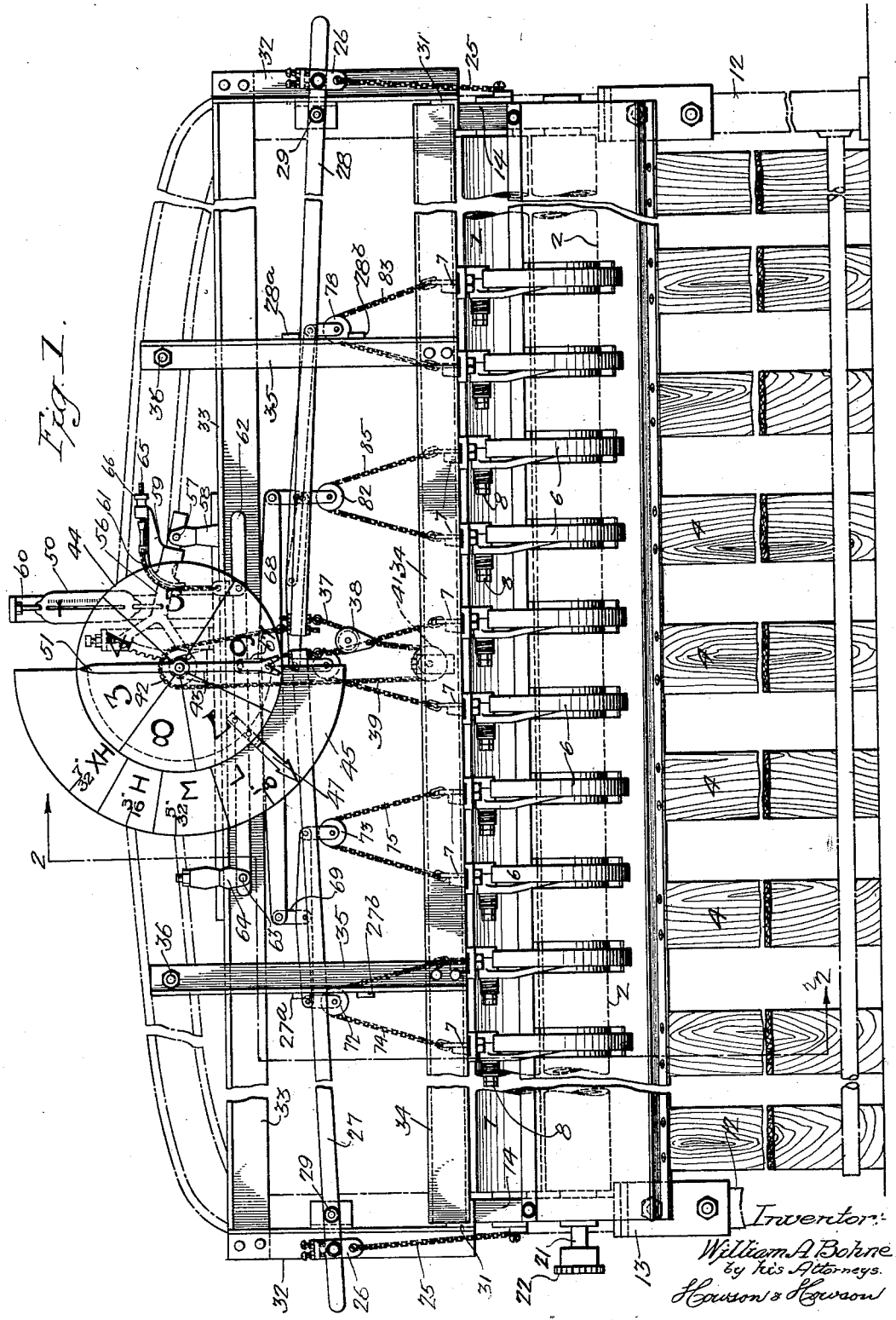
Figure 1 is a front elevation of a machine made in accordance with my invention.

With reference to the drawings, the machine consists in part of a pair of relatively movable elements 1 and 2, preferably in the form of rollers, as shown, between which the hides or other materials under test are fed, the relative positions of these rollers in operation depending upon the thickness of the test material. As shown in Fig. 2, the test material designated by the reference numeral 3 after passing between the rollers 1 and 2 is guided back under the latter roller by a suitable guide 4, thereby forming in the material a bowed portion or loop 5, which, according to the stiffness of the material under test and its resistance to bending, will project to a greater or less extent from the roller 2, the position of the loop thereby affording an indication of the stiffness or pliability of the test material.

Located in a position to be engaged by the loop 5 is a wheel or series of wheels 6 attached to one more bell crank levers 7 pivotally mounted at 8 upon the fixed frame of the machine. The position of the wheel 6 and of the lever 7 accordingly is determined by the character or position of the loop 5, the wheel being farther removed from the roller 2 when the material under test is relatively stiff and unpliable. By associating with the rollers 1 and 2 and the lever or levers 7, as hereinafter described, an indicating mechanism properly calibrated, I provide an instrument which affords a direct indication of the relative pliabilty of a material corrected for varying thicknesses, and thereby affords an accurate indication of the renitence of the different materials or elements under test.

The mechanism illustrated in the attached drawings is adapted primarily for determining the relative textures of hides or sheets of leather, and the machine forming the subject of the present invention takes the form of an attachment for a machine whose function is to mechanically determine the surface area of individual hides or irregularly shaped pieces of leather. The frame of this machine, which forms no part of the present invention, is designated by the reference numeral 11. To uprights 12, 12 constituting a part of the frame 11 are attached angle brackets 13 which support a retainer and guide 14, 14 for the journal boxes 15 and 16 of the rolls 1 and 2. The journals 16 for the roll 2 rest in the bottom of the retainer 14, while the journals 15 of the roll 1 are movable vertically in the guide 14, as shown in Fig. 3. In each instance, a spring 17 tends to hold the journal 15 down upon a rubber pad 18 which bears upon a block 19 of wood, the latter resting upon the journal 16. The reduced extension 21 of the roll 2 carries a sprocket wheel 22 which is connected through a chain 23 with a suitable source of power (not shown) whereby this roller may be rotated to feed the material under test between the rollers. It will be apparent that the roller 15 may move upwardly in the guide 14, its relative position, in operation, with respect to the roll 2 being determined by the thickness of the test specimen.

Figure 4:
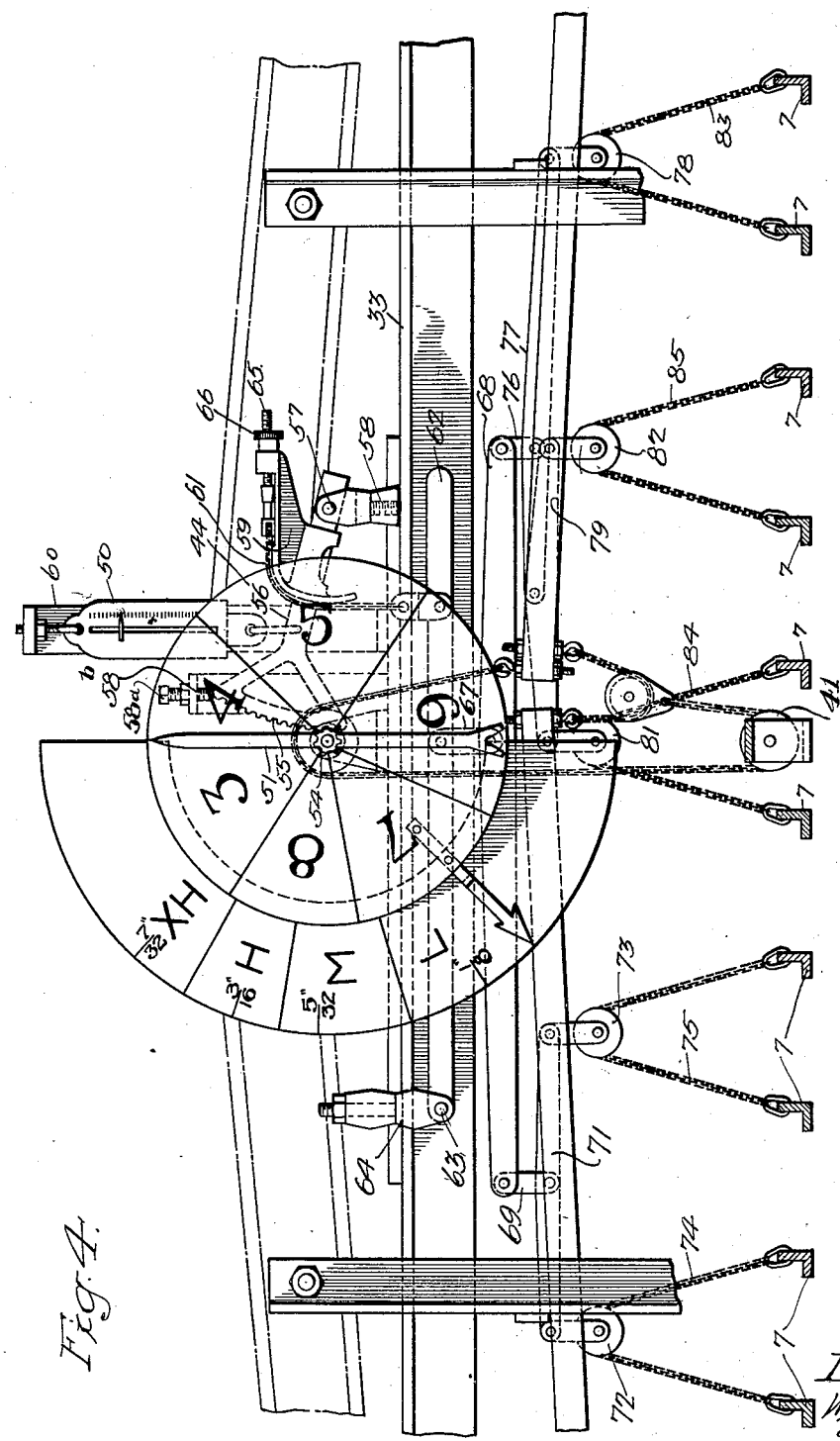
Fig. 4 is an enlarged fragmentary front elevational view of the upper portion of the machine.

Each of the journals 15 has connected thereto through an element 24, see Fig. 3, a chain 25 which depends from a clamp 26, these clamps being secured respectively to the outer relatively short arms of a pair of levers 27 and 28 pivotally fixed at the points designated 29 to the opposite sides of a sub-frame supported on the guides 14, this sub-frame consisting of lower forwardly projecting horizontals 31 secured respectively to the tops of the guides 14, rear uprights 32, a transverse cross piece 33 connecting the tops of the uprights 32, and a lower transverse cross piece 34 which extends between the forward ends of the lower horizontals 31. This sub-frame is supported and reinforced by a pair of forward uprights 35 which extend upwardly from the cross bar 34 and are secured at their upper ends by stay bolts 36 to the fixed frame 11. The levers 27 and 28 project inwardly towards the center of the machine, and both inner ends are connected through a chain 37 and a pulley 38 with a chain 39, this latter extending around a pulley 41 secured to the cross bar 34 and around a second pulley 42 journaled in a bracket 43 on the upper cross bar 33, the chain passing over the pulley 42 and being secured to the inner end of the lever 28. The arrangement is such that any vertical movement of the inner ends of the levers 27 and 28 results in a rotation through the chain 39 of the pulley 42 and also of a circular dial 44 secured to this pulley. The chain 39 is secured to the face of the pulley 42 by means of a clamp 40 whereby the connection between these elements is a positive one preventing slippage. Adjacent the periphery of the dial 44 is a semi-circular dial 45 secured to and supported by a bracket 46 attached to the cross bar 33. The dial 44 carries a pointer 47 which when the said dial is rotated moves over the face of the dial 45, and the latter dial is calibrated, as illustrated in Figs. 1 and 4, in terms of thickness of the test materials, which as previously set forth are passed between the rolls 1 and 2. By the foregoing arrangement, it is apparent that insertion of a test specimen between the rolls 1 and 2 will result in an elevation of the roll 1 in accordance with the thickness of the specimen, thereby permitting the inner ends of the pivoted levers 27 and 28 to drop by gravity, and through the chain 39 and associated elements effecting a partial rotation of the dial 44. In any operation, therefore, the angular position of the dial 44 depends upon and is determined by the thickness of the test specimen, which thickness is indicated by the pointer 47 upon the calibrated dial 45.

It will be noted that the weight of the roller 1 is sufficient to maintain the inner ends of the levers 27 and 28 in an elevated position, this position being determined by stops 27a, 28a on the uprights 35, these stops thereby determining the normal or inoperative positions of the dial 44. Similar stops 27b, 28b limit the downward movement of the inner ends of the levers 27 and 28 in the event that the thickness of the material passed through the rolls 1 and 2 is greater than the capacity of the machine.

Associated with the dial 44 is a pointer 51. This pointer is carried on the end of a shaft 52 which extends freely through the pulley 42, and at its rear end is journaled in an upstanding part 53 of the bracket 46. The shaft 52 carries a pinion 54 which meshes with a segmental gear 55 carried at the end of an arm 56 pivotally mounted at 57 upon a bracket 58 on the frame cross bar 33. Normally this arm 56 is supported in an elevated position, as shown in Fig. 4, by a spring (not shown) which in the present instance is calibrated and constitutes a part of a spring scale 50, which scale is supported upon a bracket 60 on the cross bar 33. This scale in addition to normally supporting the arm in the elevated position also indicates the force tending to depress the arm at any time. The upward movement of the segmental gear of arm 56 is limited by an adjustable stop 58—a supported from the frame piece 33 and shown in the present instance as comprising a screw directed through a support 58—b overhanging the segmental gear. The arm 56 carries a shoe 59 to which is secured a flexible connector 61, which connector depends from the shoe and is connected at its lower end to the outer end of a lever arm 62, this arm being pivotally connected at 63 to a bracket 64 on the frame cross bar 33. Means is provided on the shoe 59 for adjusting the length of the connector 61, this taking the form of a screw 65 one end of which is attached to the said connector, while the other end carries a nut 66 which abuts a fixed shoulder on the shoe and provides means for adjustment in obvious manner.

Depending from the lever 62 through the medium of a link 67 is a lever 68, and to one end of this lever 68 is suspended through the medium of a link 69 a relatively small lever 71. Depending from the ends of the lever 71 are sheaves 72 and 73, and over these sheaves pass chains or other suitable flexible connectors 74 and 75 respectively, the ends of which are secured to the upper ends of a corresponding number of the bell crank levers 7. From the opposite end of the lever 68 is suspended by a link 76 a lever 77, this lever carrying at one end a sheave 78 and having pivotally secured to the opposite end a lever 79, from the opposite ends of which depend sheaves 81 and 82. Passing over each of the sheaves 78, 81 and 82 are chains or similar flexible elements 83, 84 and 85 respectively, the ends of which in each instance are connected individually to others of the plurality of bell cranks 7 which are included in the present machine. It will be noted that the arms of the levers 68, 71, 77 and 79 are so proportioned and arranged that a substantial balance is obtained in this system of levers. Thus the levers 71 and 79, to the opposite ends of each of which are secured two of the levers 7, comprise equal lever arms. One arm of the lever 77 on the other hand carrying twice the weight of the other arm is only one-half as long so that a substantial balance is obtained. In the case of the lever 68, on the other hand, one arm carrying one-half again as much weight as the other end, the other end is substantially one-half again as long as the opposite end of the lever.

Assuming that the pointer 51 normally occupies the position shown in Figs. 1 and 4 and that a given test material is passed between the rollers 1 and 2, it will be apparent that the wheels 6, of which in the present instance there are ten, will be displaced outwardly, as indicated in broken lines in Fig. 2, with the result that the inner ends of the levers 7 will be depressed, drawing down with them the system of levers connected to the lever 62, and thereby effecting a depression of the lever 56 and a partial rotation of the pointer 51. The extent of the movement of the pointer 51 obviously will depend upon the stiffness or non-pliability of the test material and will correspond in effect to the average pliability over the entire area of the test specimen in contact with the wheels 6. The dial 44 may be calibrated, as illustrated, to give different ranges of pliability which may be found suitable for different purposes.

The thickness of the material, however, will affect the pliability factor, and in order to obtain an accurate renitence indication, it is necessary to correct the pliability reading for different thicknesses. This correction is effected through the rolls 1 and 2 which as previously set forth are connected with the dial 44 in such manner as to effect an adjustment of the dial in accordance with the thicknesses of the test specimen.

Although the device herein described is applicable primarily to the determination from a relative point of view of the renitency of hides and leather, it will be apparent that the device in principle is applicable with minor changes to similar determinations of the renitency of other materials than leather.

In a specific operation, it will be noted that a depression of the inner ends of the levers 7 in the manner described results in a depression through the intermediate linkage of the lever 56 and a consequent clockwise rotation of the dial 51. Elevation of the roll 1 due to passage between it and the companion roll 2 of the test specimen results through the interconnecting mechanism including the levers 27 and 28 in a partial rotation of the dial 44 in the same clockwise direction. Thus, the greater the thickness of the specimen, the further the pointer 51 must travel to reach a given section on the dial 44. This increased movement of the pointer is insured, however, by the increased stiffness in the specimen due to the greater thickness. With a like renitency, therefore, it will be apparent that a plurality of specimens will show a similar reading on the dial 44 regardless of thickness. The device, of course, affords both a measure of renitence and of the thickness of a specimen.

There may be considerable modification without departure from the invention.

I claim:

1. In a renitence measuring machine, the combination with a pair of relatively movable elements, of means for passing a test specimen between said elements whereby the relative position of said elements is determined by the thickness of the said specimen, a movable dial, means connecting said dial and one of said elements whereby the position of the dial is controlled by the relative positions of said elements, guide means for effecting a free loop in said test specimen the position of which is determined by the renitence of the specimen, and mechanism actuated by the looped portion of the specimen and including an indicator co-acting with the dial and affording with the latter a visible indication of the renitence of the test specimen.

2. In a testing machine, the combination with feed means for a test specimen, of means for creating a free loop in said specimen in the feeding operation, a plurality of elements adapted for actuation by the looped portion of said specimen, indicator mechanism, and means including a system of levers operatively connecting said elements with the indicator mechanism.

3. In a testing machine, the combination with feed means for a test specimen, of means for creating a free loop in said specimen in the feeding operation, the position of said loop affording a measure of the renitence of the specimen, a plurality of elements adapted for actuation by the looped portion of said specimen and arranged to engage the specimen at spaced points throughout its width, indicator mechanism, and means including a system of levers operatively connecting said elements with the indicator whereby the latter gives an indication of the average renitence of the specimen in the looped portion.

4. In a renitence testing machine, an indicating means including two relatively movable members relative movement of which affords an indication, means for forming a free loop in the specimen being tested, means co-acting with said loop for shifting one of the members of the indicating means, and means responsive to the thickness of the specimen under test for shifting the other member of said indicating means to thereby vary the indication afforded by shifting of the first-named member.

5. In a machine for testing renitence, the combination with indicating means, including two relatively movable members relative movement of which affords an indication, of means for deforming a test specimen, means responsive to renitence of the specimen under test and co-acting with the deformed section for shifting one of said members, and means responsive to a dimensional measurement of the specimen which affects renitence for shifting the other member of the indicating means to thereby modify the indication afforded by shifting of the first-named member of said indicating means.

6. In a renitence testing machine, means for forming a free loop in a specimen to be tested including an element movable in response to variations in thickness of the specimen, an indicating means including relatively movable members relative movement of which affords an indication, means controlled by said element for shifting one of said members, and means controlled by the extension of the loop for shifting the other of said members.

7. In a machine for testing renitence, means for forming a free loop in a specimen to be tested, a movable dial, an index associated therewith and movable relatively thereto, means for shifting one of said two relatively movable members through a distance proportional to the average thickness of the specimen being tested, and means for shifting the other of said two relatively movable members through a distance proportional to the average renitence of the specimen as disclosed by the extension of the free loop.

8. In a renitence testing machine, the combination with a group of elements, the position of one of the elements of the group being controlled by the thickness of a test specimen engaged therewith, of means for forming a free loop in said test specimen, the position of the loop constituting a measure of the renitence of the test specimens, a second group of elements actuated by the loop portion of said specimen, a single indicator device having two relatively movable members, mechanism connecting said controlled element of the first group of elements to one of said indicator members to move the same, and means connecting the second group of elements to the other of said indicator members to move the same.

9. In a testing machine, indicating means including a rotatable dial and a co-acting relatively rotatable pointer, means for deforming a test specimen, means for rotating one of said two relatively rotatable members and responsive to renitence of the test specimen at such deformation, and means for rotating the other of said two relatively rotatable members in response to thickness of the specimen.

WILLIAM A. BOHNE.